Jan. 23, 1968     P. ANDREWS     3,364,581
DUAL SQUARE
Filed Jan. 24, 1962     3 Sheets-Sheet 1
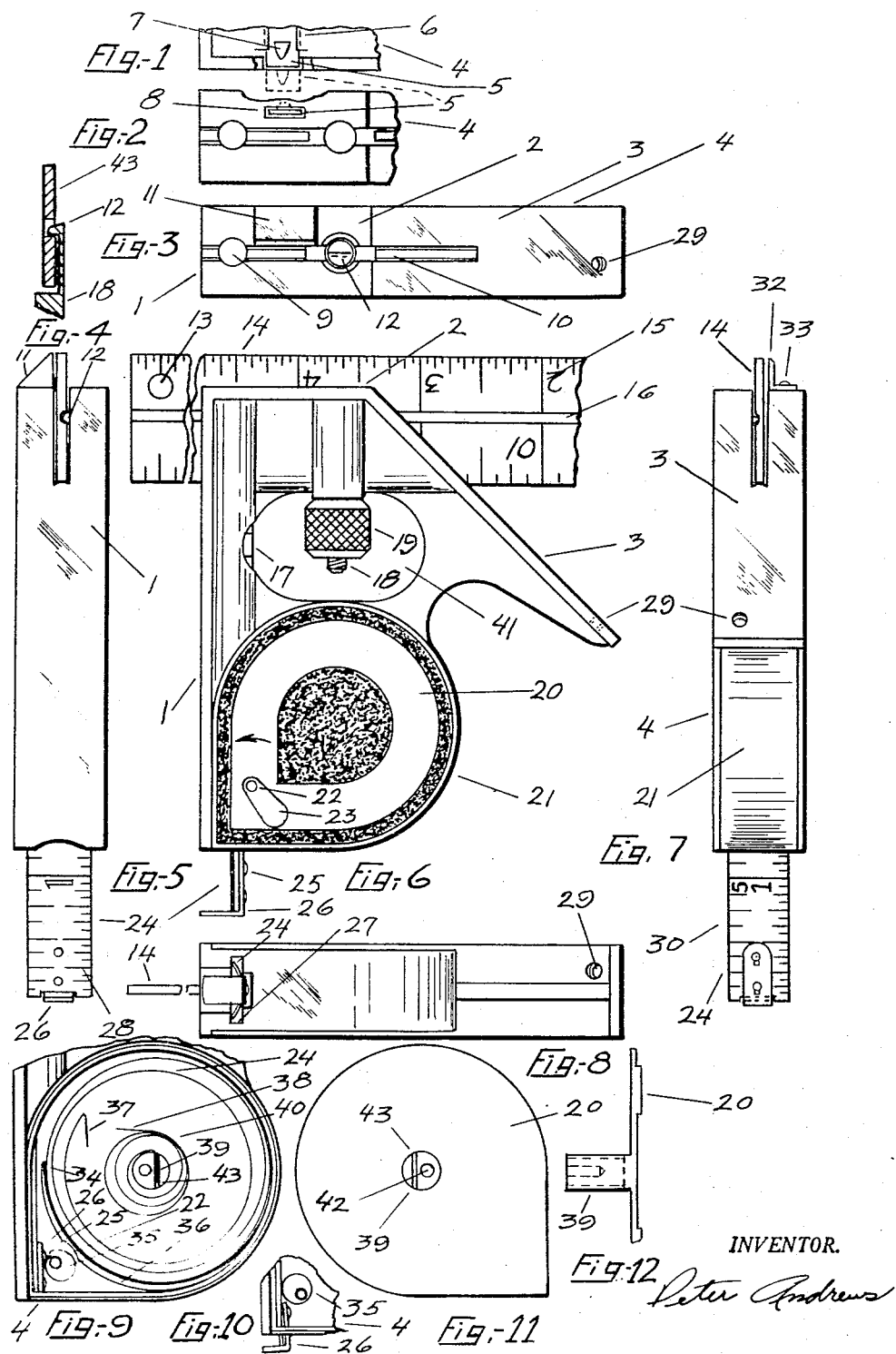
INVENTOR.
Peter Andrews

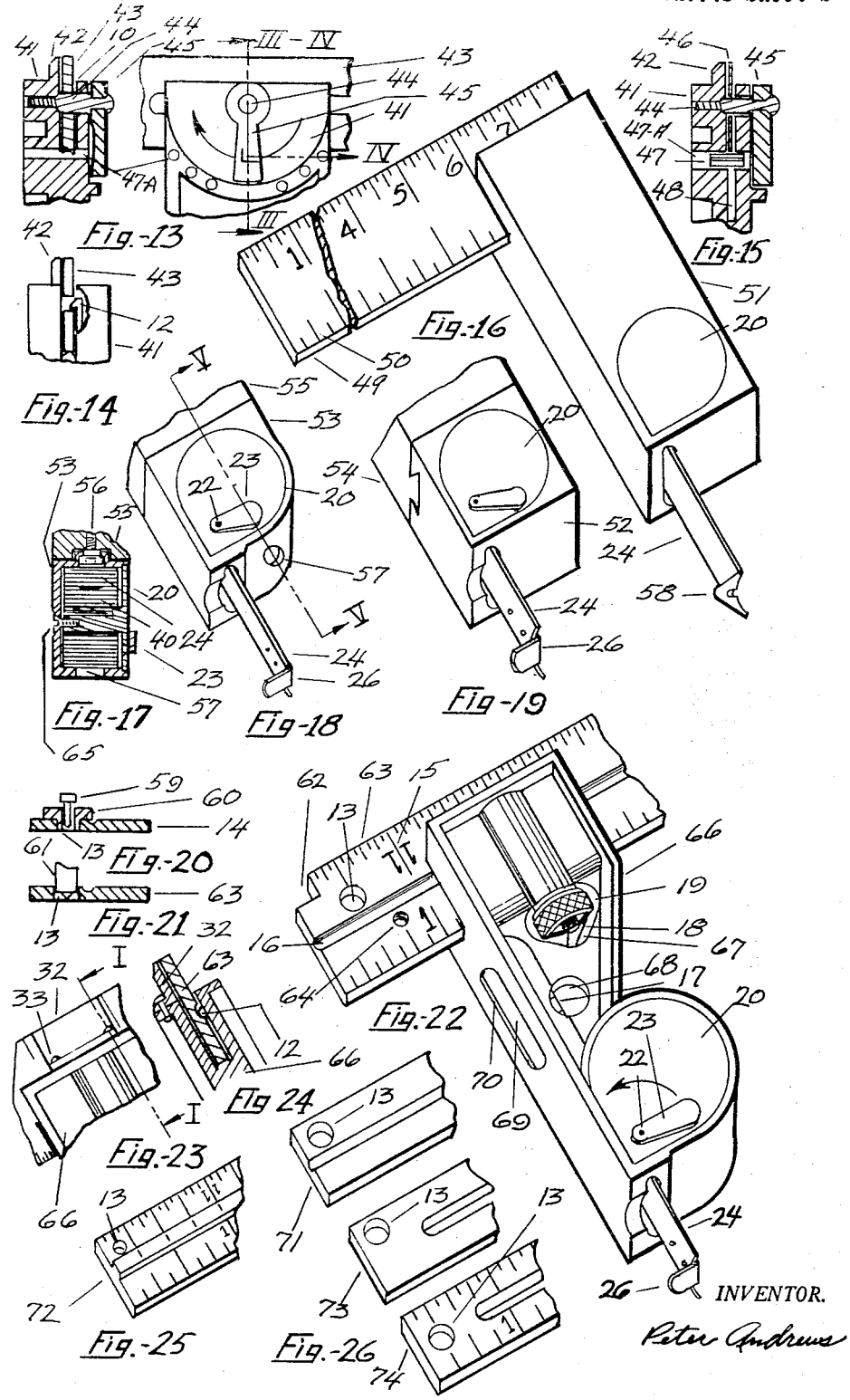

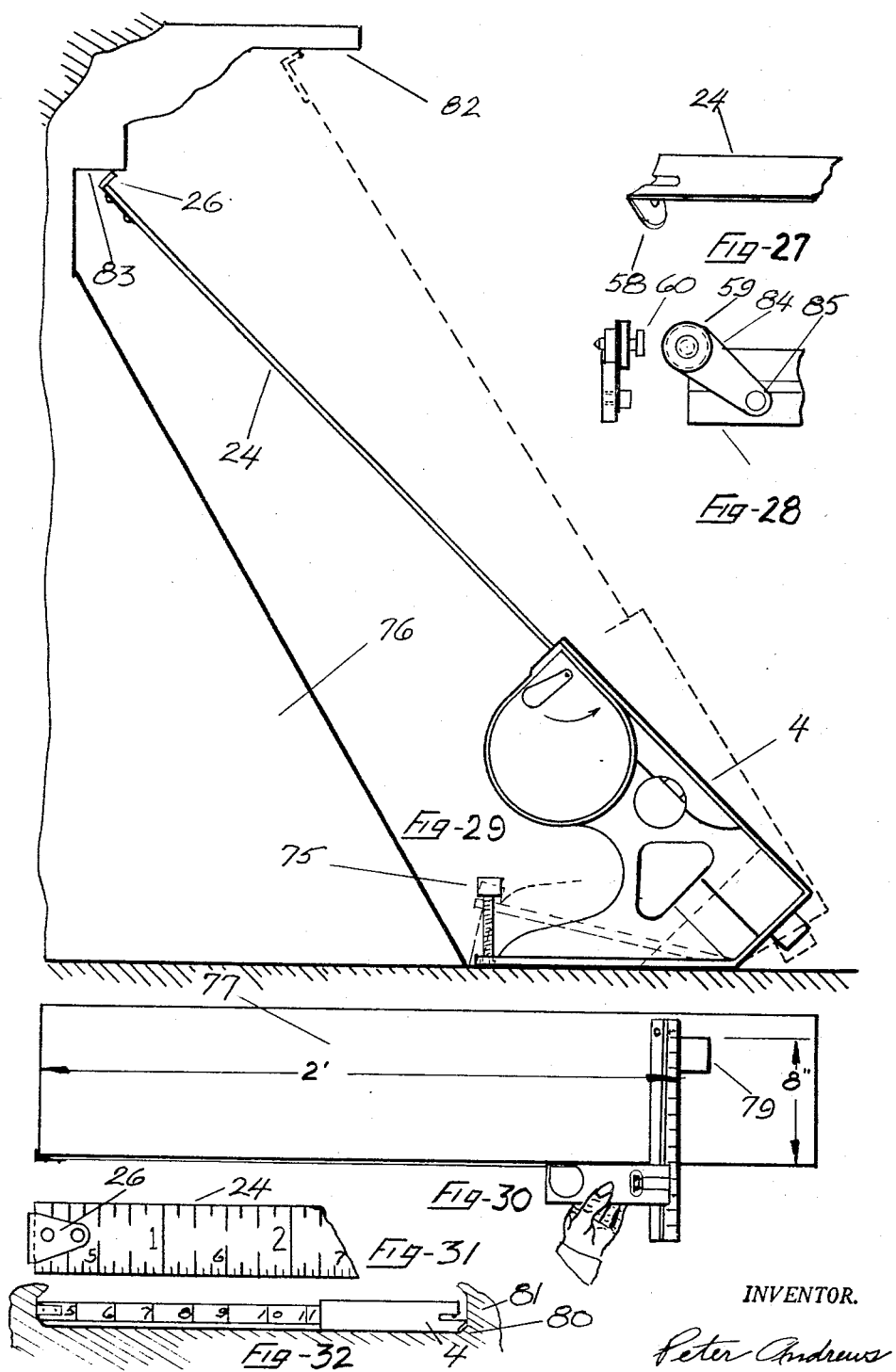

United States Patent Office 3,364,581
Patented Jan. 23, 1968

3,364,581
DUAL SQUARE
Peter Andrews, 190 Gebhardt, Road,
Penfield, N.Y. 14526
Continuation-in-part of application Ser. No. 786,069, Jan. 12, 1959, which is a continuation-in-part of application Ser. No. 611,926, Sept. 25, 1956. This application Jan. 24, 1962, Ser. No. 167,609
15 Claims. (Cl. 33—189)

This invention relates to the tools of the type used by artisans, carpenters, machinists and mechanics and known generally as universal or combination squares, solid squares, tri-squares, bevel squares or any like implements.

This application is a continuation-in-part, undiminished, of my pending application Ser. No. 786,069, filed Jan. 12, 1959 and said 786,069 application was a continuation-in-part of my then pending application Ser. No. 611,926, filed Sept. 25, 1956.

A very important object of my invention is to greatly increase the utility of said squares and like implements by combining therewith, to the head of said squares and like implements, a resilient, graduated, flexible tape measure or rule having a cross section of concavo-convex or other suitable non-planar cross section, when free, and when extended forms a rectilinear rod-like state. The said tape or rule is housed within a cavity provided therein said heads or a tape or rule casing, having said tapes therein, and which casing is attached, secured, or fixed thereto said heads. The heads of the said squares or the said casings could have a lock, a tape controller, a tape deflector, or any normal element deemed necessary. The dual square can thereby be transformed, quickly and easily, into a generally one piece semi-rigid gauge, to execute various operations in a more facile, economical and efficient way, in an inclined, verticle, or horizontal directions.

Another important object of my invention is to use the head of the dual square, in the one embodiment having a side edge at an oblique angle which is described later, as a surface gauge.

A further important object of my invention is to provide a hole through one end of a graduated rule whereby a circle can be scribed therethrough, or a surface, center punched, prick punched therethrough and the hole to be used for locating therein a portion of a small bushing which is provided with a punch therein to center punch or a flat tipped punch for punching a hole through a sheet or into a surface and these operations are executed in two directions and in only one operation, in an inclined, verticle or horizontal direction, and can be repeatedly and accurately executed.

Another object of my invention is to enable a person to use the head of the dual square as an angular adjustable surface gauge by providing therein said head, which is provided with a 45 degree side edge, a tapped hole into which an adjusting screw is inserted for tipping the head into different angles when the said tape measure or rule is extended therefrom for surface gauging, as is a surface gauge in the tool making art.

A still another object of my invention is to enable a person to measure from a wall or surface having a large obstruction in its corner accurately and in a verticle, inclined or horizontal direction in one operation and repeatedly through the use of a dual square having an end of a graduated rule fixed to one end of an elongated dual head whereby the said tape measure or rule when extended forms an extension of the graduated rule through the inherent tendency of the said tape or rule to form a rod-like state.

And another object of my invention is to provide the dual square with a separate, magnetized bushing or a bushing being of a magnetic material or composition, whereby it will fit into the said hole provided in one end of the graduated rule or straightedge, thereby adhering to the said rule or straightedge when executing a center punching or hole punching operation. The inherent magnetic character of said bushing permits one to use a punch, if desired, which is magnetically retained therein said bushing and thereby no set screw, bushing shoulder, or even a spring need be used to retain a punch located therein said bushing, and this feature is generally shown in FIG. 20.

And yet another object of my invention is to provide the said tape measure or rule with a magnetized or magnetic hook whereby said hook will aid in using the dual square beyond the range of self supporting rod-like tape measure or rule.

And still another important object of my invention is to provide a generally knife edge stop on one end of the heads, of the squares, to enable a person to make inside measurements accurately and with a small filleted or small obstruction therein the corners of the inside closure and to enable a person to use the dual square in making the inside measurements, with or without the graduated rule or straightedge therein, said head thus providing also a one figure overall addendum to be added to the extended said tape measure or rule if not already provided thereon said tape measure or rule.

And the last object of my invention is to provide a lock having a camming action and so located adjacent the said tape measure or rule with a tape hook secured thereto that a slight rotation of said cam lock, which is rotated by externally accessible means of an arm fixed to one end of the cam lock, in a counterclockwise direction, and thereby allows the said lock to exert a force against the straight end portion of the said hook. This action forces the formed part of the said hook away from the said head whereby the grasping of said hook, is facilitated, especially in cold weather when gloves are worn and the removal is not particularly desired and the tool is also cold for the handling thereof.

Objects relating to the details, convenience and economies of the invention will appear from the description to follow. The invention is also defined and pointed out in the claims.

Preferred embodiments of the invention are illustrated in the accompanying drawings, in which:

FIG. 1 is a fragmentary side view of the head 4 showing a detentable stop 5 with formed detent 7 and the raised position of stop 5 in dashed line outline above surface 2 of head 4 along with the detent channel edges 6 of head 4. The detentingly raised stop 5 would thereby have its uppermost butting edge surface in verticle alignment with the outer edge of a graduated rule or a straightedge, whenever either one is removably locked in slot 10, for example, as is the butting and generally rectangular knife edge surface of stop 32 thereto rule 14, as shown in FIG. 7 and again generally as is the upper edge of stop 11, shown in FIG. 5.

FIG. 2 is a fragmentary top plan view of the combination head of the square.

FIG. 3 is a top plan view of the combination head of the square.

FIG. 4 is a fragmentary cross section of a nib ended stud having its nib engaged therein a slot of a cross sectioned straightedge.

FIG. 5 is a front view of one embodiment of the dual square.

FIG. 6 is a side fragmentary view of same embodiment of the dual square which is shown in FIG. 5.

FIG. 7 is a rear view of the dual square embodiment substantially of that which is shown in FIGS. 5 and 6.

FIG. 8 is substantially a bottom view of the dual square embodiment of that which is shown in FIG. 6.

FIG. 9 is a fragmentary uncovered view of the lower embodiment portion thereof the dual square head which is, for example, shown in FIG. 6.

FIG. 10 is a cam actioned, fragmentary lower left corner view of the previously disclosed FIG. 9 portion.

FIG. 11 is a top plan view thereof the underside of the cover which, for example, covers up the open, tape measure cavity, which is substantially shown in FIG. 9.

FIG. 12 is an elevational edge on side view of the cover which is shown in FIG. 11.

FIG. 13 shows one fragmentary cross sectional view, substantially taken along the cross sectional line, III—III, of the fragmentary side view of the top portion thereof a completely different embodiment, of a head of a square, which head also has different elements, and also having a different construction, design and operation, from that which was previously shown, for example, in FIG. 5.

FIG. 14 is a fragmentary front, top portion, view thereof a still another nib ended stud clamping means, embodiment which could be used in the head, for example, that is disclosed in FIG. 13, and FIG. 15, if desired.

FIG. 15 is a fragmentary cross section view thereof a sliding pin construction which is in the head of a square and thereby having a still different embodiment than that which is shown in cross section in FIG. 13. FIG. 15 is taken partially along Roman numeral 4—4 of the side view shown in FIG. 13 and also taken substantially along Roman numeral 3—3 of the same side view shown in FIG. 13.

FIG. 16 is a perspective side view thereof a still another embodiment which is substantially that of a dual tri-square combination tool.

FIG. 17 is a fragmentary perspective side view, for example, of FIG. 16 but having herein this embodiment, a pivotingly secured, resilient, flexible and graduated concavo-convex tape maesure dual casing and assembly of adjunct elements taken along Roman numeral 5—5 of FIG. 18.

FIG. 18 is fragmentary perspective view of the pivotingly secured, dual casing tri-square embodiment and a portion of which is shown in cross section in FIG. 17.

FIG. 19 is still another embodiment of a dual casing tri-square, shown in fragmentary perspective, having a removable disclosed tape measure dual casing means.

FIG. 20 is a fragmentary cross sectional end view of substantially the rigid rule which is shown in FIG. 22, taken perpendicularly from the longitudinal outer edge the rigid rule and through the opening which is shown therein and into which opening only a center punch and/or bushing set is nested.

FIG. 21 is an end on cross sectional view of the substantially rigid rule, taken also through the opening therein which was disclosed hereabove in FIG. 20 and which opening having nested therein, the end of a large ended, automatic center punch.

FIG. 22 is a perspective view thereof a still another embodiment thereof this "Dual Square Combination Invention."

FIG. 23 is a fragmentary side view thereof the unseen portion thereof the "Dual Square Combination" which is shown on FIG. 22.

FIG. 24 is a cross sectional view taken along line Roman numeral 1—1 of FIG. 23.

FIG. 25 is a fragmentary perspective view of a graduated raised ribbed rigid rule.

FIG. 26 shows a fragmentary perspective view of three different types of rigid rulers, all having an opening, therethrough their thickness at one end thereof.

FIG. 27 is a fragmentary perspective view thereof a formed integral hook-ended tape measure.

FIG. 28 shows a fragmentary top plan view and a side plan view thereof a nested center punch and bushing set which is removably secured to the end portion of a grooved graduated ruler.

FIG. 28A is taken through Roman numeral 6—6 of the side view shown in FIG. 28 and shows exactly how the bushing of a punch and bushing set is nested therein and against, at least, a portion of the inside wall thereof the notched opening which is therein the corner of the graduated rigid ruler.

FIG. 29 is a side plan, new result performance, operational view that is obtained by use of the oblique angled, dual square head assembly only even without use of the rigid rule locking means (not shown). The view is thereby showing the dual square head means being used as a surface guage as is, for example, a tool makers surface gauge.

FIG. 30 is a top plan operational view showing how a new result is obtained by use thereof this "dual square" embodiment which is shown as having an elongated square head.

FIG. 31 is a fragmentary top plan view of a curved in cross section when free extended tape measure having indicia which already includes therein, the overall addendum length of a dual square head (not shown) but is substantially shown in FIG. 32 and/or an addendum inclusion of the dual square head therewith a rigid ruler clamped therein (not shown) but if reference is made, for example, to FIG. 7 and having FIG. 32 illustration in mind whereby one will readily apprehend how this is readily accomplished. The conventional starting indicia of 1 inch is also shown thereon the same face of the curved tape measure as is also shown in FIG. 7 which has another optionally, positioned, starting indicia addendum thereon.

FIG. 32 shows another operational side view thereof a portion of this "Dual Square" and shows the abutted beveled stop, thereof the substantially semi-rigid gauge tool, clearing a filleted corner obstruction. The view further shows that the face of the curved tape as having only one starting indicia thereon and which indicia already includes the overall length thereof the square head if so desired.

Hereafter this detailed descriptive portion of this specification that is to follow the applicant has chosen to further, in part, incorporate the FIGS. 2 to 32 therewith the detailed description of the various views which are shown in the drawings in order to more fully give one an immediate and clear understanding of this improved "combination invention."

FIGURE 2 is a top view of dual head 4 showing the detent slot 8 and stop 5 therein.

FIGURE 3 is a top plan view showing one preferred embodiment of my combination invention of said head 4 showing bubble vial hole 9, graduated rule or straight-edge receiving slot 10, bore 11 with the nib 12 of stud 18 showing therein, top view of stop 11 and a tapped hole 29, in surface 3 of head 4. The top view of stop 11 shows a generally rectangular knife edge surface 111, which would be in verticle alignment with the outer top edge, for example, the graduated rule 14 in slot 10, as shown in FIG. 5, whenever said rule or even a straightedge is therein slot 10 of FIG. 3.

FIGURE 4 is a cross section showing how the nib 12 of stud 18 can be used to secure a slotted straightedge to head 4 (not shown).

FIGURE 5 is a front elevational view of said head 4 showing nib 12 located in groove 16 of rule 14, a side view of stop 11 which is an integral part of said head 4, a curved scalloped area 31 for bent part of hook 26 and extended resilient tape measure 24 showing graduations 28 thereon.

FIGURE 6 is a side elevational of the dual square showing graduated rule 14, graduations 15, hole 13, level vial or bubble 17, threaded terminal of stud 18, tightening nut 19, hole 41, cavity cover 20, lower part 21 of head 4 in which said tape measure 24 and adjacent parts are housed. The FIG. 6 also shows edge 1, part of top edge 2, oblique angle edge 3, pivot shaft 22, of cam 35 not shown, cam rotating arm 23, tape 24 extended showing hook 26 with rivet heads 25.

FIGURE 7 is a rear elevational view of said square showing tapped hole 29 through oblique surface 3, rule 14 and an alternate stop 32 attached to surface 2 with rivet or screw 33 and said tape measure 24, extended to show that the graduations thereon could start with the overall length of said head 4 and thereby also have the 1 inch starting indicia on the other side, as is shown, if desired and which overall head length indicia would be inclusive to top edge of stop 32.

FIGURE 8 shows a bottom view of said head 1 showing the curvature of the concavo-convex resilient tape measure 24, which tape curvature also could be inserted 180 deg. as shown in FIG. 22, if desired and also shown is aperture 27, bottom view of hook 26 and tapped hole 29.

FIGURE 9 is a side elevational view of said head with cover 20 removed leaving stud 39, part of cover therein to show how end of spring 40 is threaded into slot 43 and the FIG. 9 also shows anchoring end 38 of spring 40 which is anchored to end or straight end 37 when spring 40 is housed therein and the FIG. 9 further shows said tape 24 with a bent end 37 which hooks onto the tip 34 of curved rib 36 to prevent the accidental and complete withdrawal of said tape 24 from cavity in head 4. This bent end 37 of tape 24 is used only if desired, whereby it could be left generally straight for completely removing said tape from said cavity. Curved free end 34 of rib 36 aids in manual insertion of tape 24 therein said head by forcing the inserted tip of tape 24 into a coiled shape which tip is further coiled in a clockwise direction when contacting the moving surface of tape 24. Rib 24 is an integral part of said head but could also be a separate expanding resilient band or spring if so desired. FIGURE 9 also shows the location of hook 26, rivet head or eyelet 25 positioned in respect to the retarded clockwise direction of cam 35 which is a necessary part of my invention to force hook 26 out when cam 35 is rotated in a counterclockwise direction. Also head of rivet 25 thereby detents hook 26 and tape 24 into head 4 by detenting, as shown, past cam 35.

FIGURE 10 shows the cam 35 rotated in a clockwise direction, has not clamped said tape 24 to head 4 in a fixed position and the action of which forced hook 26 and tape 24 out from head 4 to facilitate manual grasping thereonto for withdrawal of tape 24 from head 4.

FIGURE 11 shows the inside of cover 20, with integral stud 39 thereon, spring slot 43 and hole 42 into which a screw is inserted for securing cover 20 to said head 4, and can pivot shaft hole 222.

FIGURE 12 shows a side view of cover 20 with stud 39 which is an integral part of cover 20 thereby facilitating proper spring 40 tensioning, as desired, without removal of coiled spring 40 from the head cavity, shown in FIG. 9.

FIGURE 13 shows a side and cross sectional view of the top portion of an alternate design of my combination invention, whereby it shows a slotted straightedge 43, elongated head 41, arm 45, holes 47A which are not used and would be eliminated for this model where the straightedge has a bearing surface in the bottom of slot 10. FIGURE 13 also shows in the cross section, Roman numeral 3—3, top of head 41, stop 42, straightedge 43, slot 10, clamping screw 44 with arm 45 thereon and one hole 47A through said head.

FIGURE 14 shows a fragmentary front view of head 41 whereby the nib 12 is shown engaged in a slotted straightedge 43 which could also be grooved and slotted or just a slotted graduated rule 74.

FIGURE 15 shows a cross section of FIGURE 13 at, Roman numeral 5—5, whereby the head 41 having a deep slot 48 therein one end for receiving a slotted graduated rule 46, thereby forming a bevel square and when it is desired form a square whereby the side edges of head 41 will be positively disposed to extend at a right angle or oblique angle 15, 30, 45 degrees, from said rule, then one or two roll pins 47 are forced with a nail or pin through slot 48 as shown in FIGURE 15. Without pins 47 a full bevel square arrangement is obtained.

FIGURE 16 shows another design in which my combination invention is used whereby the square is in the form of a tri-square. FIGURE 16 shows graduated rule 49, fixed to head 51, graduations 50 which generally are on all four edges of rule 49, a dual head having said tape measure 24 with a hook 58 formed thereon, head 51 having its lower part in the same arrangement as previously described in FIGURE 9 and without a lock therein.

FIGURE 17 shows a cross section of FIGURE 18 at section, Roman numeral 5—5, whereby said cross section shows a head 55 with a dual casing 53, which is manually pivoted, and is secured to head 55 by a shouldered screw 56, and hole 57 could be provided to aid in tightening of screw 56 to head 55. The casing having cover 20 and therein said tape measure 24, tape control spring 40, cover securing screws 65 and cam 35, not shown. The pivoting action is necessary to enable the use of the dual square for surface as well as straight butting squaring, scribing or locating an object thereon a surface in one operation.

FIGURE 18 shows an outside view of head 55 and casing 53 thereto secured.

FIGURE 19 shows another design of a dual casing 52 whereby the head 54 has a male part of a dovetail which fits into a female part of a dovetail in dual casing 52 whereby the casing 52 can be manually removed for rotating 180 degrees to the extended rule 49 when necessary for surface operation or inside measurements.

FIGURE 20 shows a cross section of rule 63 with a hole 13 therein. The hole 13 having therein bushing 60 which could also be a magnetized bushing or could also be composed of a magnetic material such as a magnet. The bushing 60 having therein its center a pointed punch 59.

FIGURE 21 shows a cross section of rule 63 and hole 13 therein. Hole 13 has therein the point 61 of an automatic center punch. The punch, for example, could be the point of a Starrett 819 automatic center punch, which has parallel sides, as shown..

FIGURE 22 shows a second preferred embodiment of my combination invention which is to incorporate into an elongated head of a square, the upper part of which could also be as shown in FIGURES 13 and 15, the said tape measure 24. FIGURE 22 shows grooved rule 63, notch 62, hole 13, tapped hole 64 with graduations 15, a dual head 66, stud 18, nut 19, hole 67, hole 68, bubble 17, bubble cavity 70, compound 69 which covers and secures bubble 17, cover 20, cam arm 23, cam lock pivot shaft 22, tape 24, hook 26 and groove 16. The operation is the same with the lower part of this head 66 as described in FIGURE 9 of my first embodiment. The lower part of my first and this embodiment could also be made as a removal dual casing as, for example, as described in FIGURES 18 and 19 whereby the casing would be secured or fixed to the head enabling removal therefrom.

FIGURE 23 shows the upper back of head 66, with stop 32, rivets or screws 33 to attach or fix the stop 32 to top of head 66 to create one overall addendum with or without rule 63 in said head and to allow making inside corner measurements with a small fillet therein.

FIGURE 24 shows a cross section through, Roman numeral 1—1 of FIGURE 23 whereby it shows stop 32, rule 63, nib 12, and head 66.

FIGURE 25 shows a graduated ribbed rule with hole 13 therein which could be 6 inches to 24 inches in length. By head 4 having a shouldered slot therein, whereby the rib could glade above the shoulder and the nib 12 would clamp on to the top edge of the rib as it does in a groove or slot.

FIGURE 26 shows a grooved straightedge 71, a slotter straightedge 73 and a slotted graduated rule 74, all having hole 13 therein also which could be from 6 inches to 24 inches in length.

FIGURE 27 shows said tape measure with a hook 58 formed thereon an end and a reinforcing formed groove in its bent corner.

FIGURE 28 shows rule 63 with a bushing 60, bushing arm 84, punch 59 and a screw 85 secures arm 64 to rule 63 and thereby through arm 64 nestingly secured bushing 60 in corner 62 of rule 63 in such a position that the imaginary outside edge of rule 63 and imaginary end of rule 63 meet in the center of the bushing 60 and thereby automatically having direct measurements or addendum when using the dual square as a one piece gauge for center punching, for example, a surface in two directions, at one time in only one operation. The screw 64 mechanically secures arm 84 to rule 63, by using the tapped hole 64, in rule 63, as is shown in FIG. 22. FIG. 28 shows the underside of FIG. 28 as indicated by Roman numeral 4—4 and thereby it shows how the magnetically attracted or mechanically secured bushing 60 is accurately located into and against a generally 2 point contact with the inside surface of notch 62. The punch point is thereby directly in the center of the intersection of the top edge and end edge of rule 63. Center punching indicia settings are thereby possible with complete disregard of any indicia compensation for the punch and bushing set, which is secured to the end of the rule 63. The rule may thereby even be used in any combination head or cross piece which serves as right angle head. The magnetic bushing 60 as shown in FIG. 20 or even the punch as shown in FIG. 21 may thereby be nested in notch 62, if desired, and thereby arm 84 or tapped hole 64 need not be used at all. The bushing 60, when used with arm 84, need not be magnetized, if so desired.

FIGURE 29 shows the dual square having an oblique side edge, used as a surface gauge. Allen screw 75 is inserted in tapped hole 29, in surface 3 of head 4 allows fine adjustment of head 4. The rod-like state of said tape measure extended from head 4 at an oblique angle makes this surface gauging possible. FIGURE 29 shows the tape 4 extended over obstruction 76 to ledge 83 and still further at a more vertical angle of tape 4, to ledge 82.

FIGURE 30 shows the dual square being used in locating a block 79, 2 feet from the end of the board, and 8 inches in, in one operation or to center punch a surface as fully disclosed in FIG. 28, would also be executed in one operation.

FIGURE 31 shows a tape measure 24 which could have thereon a reading, for example, to automatically give direct reading from the end of hook 26 to the stop 11 on head 4. If head 4 measures 4 inches overall then the figure 5 would start with the figure 1 on the tape, etc. The reading as shown on tape 24 in FIGURE 31 indicates that the head is 4½ inches overall. The indicia shown and disclosed in FIG. 7 parallels this showning also and the indicia shown on each side of tape 24 greatly eliminates error in manually reading of the correct indicia by having both of them on the same face of tape 24.

FIGURE 32 shows the dual head being used for an inside measurement and stop 11 overcoming the fillet 80 of object 81. The FIG. 32 further shows only the head overall indicia at the starting point on tape 24, if so desired, or said tape 24 may have indicia as in FIG. 5, if desired.

The very important object of my combination invention will now be more fully disclosed whereby the head of a square, be it any type mentioned herein forming a combination therewith said resilient tape measure or rule 24, which is characterized by utilizing the inherent tendency of the said tape to unwind its outermost coil with a rotary angular sweeping movement to free itself when coiled. The tape 24, being in the form of a ribbon, is of suitable thickness and curvature to be stiff and form a rectilinear rod-like state when extended and free. Said tape measure when wound on a drum, a reel or upon itself takes the form of a coiled flat strip. When the said tape 24 is used, without a coiled tape control spring, the outermost convolution will bear frictionally against a portion of the inner wall of the cavity in said head 4 or against the inner wall of an outwardly expanding resilient band housing said tape 24 it therein.

When a tape coiling or control spring 40, which has its outer end 37 anchored to the inner end 38 of tape 24, is used to control or assist said tape to remain in a neutral extended or push-pull condition, a selection is made whereby the spring will maintain a wind-up tendency sufficient to prevent the tape from buckling or chocking when pushed into the head 4 or casing by hand to store the tape therein either step-wise or all at once, somewhat as a sword is sheathed in its scabbard. When it is stated that the end of spring 40 is attached or secured to the head 4 it also is meant the same if it is secured to the post 39 of cover 20.

In using the dual square as a one piece semi-rigid gauge the head of the said square having, in this illustration, is removably secured thereto a grooved, graduated rule 24 inches long and the said tape measure which is in an extended rod-like state from the said head and at a generally right angle to the extended locked rule. Now to scribe a line, in an inclined, vertical or horizontal plane, on a production basis, on say 100 or 1000 or more boards the scribing operation would be executed in a more convenient manner, in a shorter time, and more accurate than any known tool of this caliber. The reason being that the said tape measure that is extended from and locked to said head forms a self-supporting rod-like state, when extended, for example, 2 or 3 ft. from the said head.

The operation is as follows: The tape is extended and locked to say the 20 inch mark thereon. The rule is extended to the 20 inch mark from said head and locked thereto. The left hand holds the head of the semi-rigid gauge, see FIGURE 30, and the hooking of tape 24 onto the end of the sheet of plywood or board, without using the right hand, and at the same time placing the surface of head 4 against the edge of the plywood or board with said rule on the face of the plywood or board. The right hand, which was free all this time, can now scribe the plywood or board in one operation and at one time and any number of other boards, any repeated number of times. If a block of wood, a fixture or an assembly had to be located on the surface of the plywood, say 2 ft. from the end of the board and in at a right angle, say 18 inches in from the edge of the plywood, or even on a metal surface, this could be easily, quickly, and accurately executed with the dual square once or any number of times by holding the head, again in the left hand, hooking tape, thereon, butting the head thereto, with rule extended on the surface and with the right hand you place the said block, fixture, or assembly against the top edge of the rule at the 18 inch mark. The said part was thereby located in one operation, in two different directions, accurately, and can be repeatedly executed thereon in any direction.

The same would hold true as is fully disclosed in FIG. 28 for center punching a wood or metal surface.

The surface gauge principle, which principle is generally that of a tool makers surface gauge, is believed to be also self-explanatory by viewing FIGURE 29 with its fine adjustment created by the simple use of a common threaded machine screw. Studs, rafters, shelves, fencing, stairs, electrical outlet boxes, etc. will be easily located, measured, or scribed by the use of the "dual square."

It is to be understood that the graduated tape measure 24, and which type of tape measure was disclosed in my 611,926 parent application, filed on Sept. 25, 1956, and also in my pending C.I.P. application 786,069, which was filed Jan. 12, 1959, whereby both applications had and has a graduated tape measure which was disclosed as being a flexible, concavo-convex tape measure and having a concavo-convex cross-section, when free, and also, when free, the disclosed tape measure would form a rectilinear rod-like state, whereby the tape measure had an inherent tendency to uncoil and thus form a rectilinear rod-like state, when free. The disclosed tape is further generally characterized as being flexible, semi-rigid, rigid and also resilient, depending on what state it was used or forced into or how the force was applied thereto.

In this application that same concavo-convex tape measure 24 is termed as being a resilient, normally non-planar, non-planar or as a graduated, and the like, tape measure, when free, and which disclosed term is to be understood, as being characterized and being the same type of graduated concavo-convex tape measure disclosed therein my previous 611,926 application and therein my still pending 786,069 application, whereby this application is a C.I.P. thereto as was previously herein disclosed. Thereby all the tapes disclosed therein all the previous two stated applications and herein this application are all characterized as being of the push-pull type, or self-straightening type or as is known to persons skilled in the art, as a partially self-supporting tape, or as a curved or concavo-convex graduated tape measure, which forms a rectilinear rod-like state when free and which should not be construed as a flat cross-sectional, tape measure, when free.

Having thus described my invention, what I claim as a new combination and desire to secure by Letters Patent is:

1. A square comprising in combination, a head having a graduated rule, formed with a groove along one face thereof, that is releasably secured to the head slotted to receive the said rule, said head being formed with a bore in the plane of said slot and with a clamping stud received in said bore, its end within the confines of said slot being formed to present a finger having at its free end a transverse rib to be received in said groove in said face of the said rule, and said transverse rib on said finger of said stud may be presented to said groove in said rule to engage either face of said rule to either side of said head, said head to extend laterally therefrom said rule and having a side edge disposed to extend at a right angle to said rule and also having another edge extending at an oblique angle to the first mentioned edge, said head having an aperture adjacent to the first said edge and said aperture being remote from said rule and leading into an inclosed cavity within said head wherein a resilient graduated, flexible measuring tape of concavo-convex cross-sectional shape and a spirally coiled spring means anchored at its inner end to said head is housed, said springs outer end being operatively secured to said tape, and tending to hold said tape in its wound position, the arrangement being such that said tape when being pulled from said head serves to wind said spring upon itself, the resilience of said tape and the resilience of said spring being so correlated that the strength of said spring is sufficient to facilitate the coiling of said tape when the extended portion of said tape is fed into said cavity, and any undesirable degree of frictional engagement between the convolutions of the tape and the wall of the cavity is substantially avoided, and when said tape is drawn out through said aperture it thereby forms an extension of the first said edge, and a tape lock located in said cavity adjacent to said tape for releasably locking said concavo-convex tape in an extended position and said tape has on its extended end a hook secured thereto.

2. The combination according to claim 1, wherein said head of said square is elongated and having two side edges disposed to extend from said graduated rule and at least one of said side edges extends at a right angle to said rule.

3. The combination according to claim 1, wherein a stop which is an integral part of said head is located on the end of said head adjacent to one side of the graduated rule and an end of said stop being in vertical alignment with the outer edge of the graduated rule, and said stop having its said end assume the shape of a knife edge with at least one side extending at an oblique angle from said knife edge.

4. The combination according to claim 1, wherein a stop is secured to the end of said head, adjacent to one side of said graduated rule, for aiding in making measurements.

5. The combination according to claim 1, wherein a sliding stop is provided which is detented into an extended position, adjacent to said rule, from the end of said head, having a slot therein.

6. The combination according to claim 1, wherein said tape measure having measurement indicia on both sides of said tape, and one side having indicia start with the overall length of said head and the other side of the same face of said tape starting with a one inch indicia.

7. A head of a square in combination with a resilient graduated, flexible tape measure of non-planar cross-section, when free, and having an inherent tendency to uncoil and assume a rectilinear rod-like state, said head is slotted through one end thereof, and said head having a side edge disposed to extend at a right angle to the bottom of said slot and also having another edge extending at an oblique angle to the first mentioned edge, and said head being formed with a bore in the plane of the slot with one end of said bore leading into an opening within said head and said head is provided with an enclosed cavity having a tape coiling means for said tape therein and an aperture located adjacent to the first said edge at an end thereof remote from said slot and said tape when extended forms an extension of first said edge.

8. The combination according to claim 7, wherein said head having therein a lock for releasably locking said tape in an extended position.

9. A head of a square in combination with a resilient graduated, flexible tape measure of concavo-convex cross section, when free, and having an inherent tendency to uncoil and assume a rectilinear rod-like state, said head is slotted through one end thereof, and said head having a side edge disposed to extend at a right angle to the bottom of said slot and also having another edge extending at an oblique angle to the first mentioned edge, and said head being formed with a bore in the plane of the slot with one end of said bore leading into an opening within said head and said head is provided with an enclosed cavity having a tape coiling means for said tape therein and an aperture located adjcent to the first said edge at an end thereof remote from said slot and said tape measure is coiled by manually pushing said tape into said cavity and one end of said tape projects through said aperture and when extended from said head forms an extension of the first said edge and a hook means for said tape measure is secured to the extended end of said tape.

10. The combination according to claim 9, wherein said head having therein a lock for releasably locking said tape in an extended position.

11. A head of a square in combination with a resilient tape measure of normally non-planar in cross sectional shape, when free, and having a normal tendency to assume a straight position, said head is slotted through one end thereof, and said head having a side edge disposed to extend at a right angle to the bottom of said slot and having another edge extending at an oblique angle to the first said edge, and said head being formed with a bore in the plane of the slot with one end of said bore leading into an opening within said head and said head is provided with an enclosed cavity and an aperture located adjacent to the first said edge at an end thereof remote from said slot and said tape measure is housed within said cavity and one end of said tape when extended from said head forms an extension of the first said edge, said tape has an inherent tendency to uncoil and form a rectilinear rod-like state and having a hook fixed thereto its extended end.

12. The combination according to claim 11 in which a lock is located, within said head adjacent to said tape for releasably locking said tape in an extended position and said tape having a hook secured to its extended end, said lock comprises a cam so rotatable that said lock first contacts one end of said hook, which is resting in said cavity, thereby forcing the hooking end of said hook into a more accessible position for manually grasping thereonto when said tape is to be extended from said head, and upon extending the said tape a desired amount, said cam is further rotated into clamping engagement, of said tape to said head, through the arm accessible on the outside of said head.

13. A square comprising in combination: a head having a graduated rule formed with a groove along one face thereof that is releasably clamped to said head slotted to receive said rule, said head being formed with a bore in the plane of said slot with one end of said bore exiting into an opening remote from said slot, said bore and said opening having therein a means for releasably clamping said rule to said head, said means being a stud having a means received substantially in said opening on one end thereof for releasably clamping a transverse rib on the other end of said stud against said rule, said other end being free and within the confines of said slot and formed to present a finger having said rib which may be presented to said groove to engage either face of said rule to either side of said head, said head extends laterally from said rule and having a side edge disposed to extend at a right angle to said rule and also having another edge extending at an oblique angle to the first mentioned edge, said head having an aperture adjacent to the first said edge, said aperture being remote from said rule and leading into an enclosed cavity within said head that houses therein a resilient graduated flexible measuring tape of concavo-convex cross sectional shape and a separate resiliently expanding band member means having one of its ends anchored to said head and its other end being free for deflecting the manually inserted tip of said tape measure into a generally circular path and to aid in coiling said tape therein, said tape when drawn out through said aperture forms an extension of the first said edge, said head having a tape lock means located in said cavity adjacent said tape for releasably locking said tape in an extended position, and said tape having on its extended end a hook secured thereto.

14. A square comprising in combination: a head having a graduated rule formed with a groove along one face thereof that is releasably clamped to said head slotted to receive said rule, said head being formed with a bore in the plane of said slot with one end of said bore exiting into an opening remote from said slot, said bore and said opening having therein a means for releasably clamping said rule to said head, said means being a stud having a means received substantially in said opening on one end thereof for releasably clamping a transverse rib on the other end of said stud against said rule, said other end being free and within the confines of said slot and formed to present a finger having said rib which may be presented to said groove to engage either face of said rule to either side of said head, said head extends laterally from said rule having a side edge disposed to extend at a right angle to said rule and also having another edge extending at an oblique angle to the first mentioned edge, said head having an aperture adjacent to the first said edge, said aperture being remote from said rule and leading into an enclosed cavity within said head that houses therein a resilient graduated flexible measuring tape of concavo-convex cross sectional shape having the inserted tip of said tape bent to allow insertion of said tape through said aperture but prevents without extreme manual force its complete removal from said cavity by hooking onto the free end of a generally circular integral and resiliently expanding rib housed in said cavity, said tape when drawn out through said aperture forms an extension of the first said edge, said head having a tape lock means located in said cavity adjacent said tape for releasably locking said tape in an extended position, and said tape having on its extended end a hook secured thereto.

15. A head for a square having a rule member comprising in combination: a head having one of its ends slotted for receiving said member therein, said head being formed with a bore in the plane of said slot with one end of said bore exiting into an opening remote from said slot, said bore and said opening are for receiving a means having one end thereof engage a portion of said member for clamping a longitudinal edge portion of said member against at least one bottom portion of said slot, said head being elongated and having two side edges disposed to substantially extend from said bottom portion of said slot and at least one of said edges extends at a right angle to said bottom portion of said slot, said head having an aperture in its lower disposed portion with said aperture being remote from said slot and leading into an enclosed cavity within said head wherein a resilient graduated flexible measuring tape of concavo-convex cross sectional shape and a spirally coiled spring means anchored at its inner end to said head is housed, said spring means having its outer end operatively secured to an inner end of said tape and tending to hold said tape in its wound position, said tape having a hook secured to its extended end and when said tape is drawn out of said aperture it substantially forms an extension of at least one edge portion of said head, said head having a tape lock means located in said cavity for releasably locking said tape in an extended position, and located in said head having its length parallel to at least one edge portion of said head, is a level vial.

References Cited

UNITED STATES PATENTS

| | | | |
|---|---|---|---|
| 990,355 | 4/1911 | Hasting et al. | 33—43 |
| 992,170 | 5/1911 | Crane | 33—137 |
| 1,179,368 | 4/1916 | Brogdon | 33—95 |
| 1,434,528 | 11/1922 | Crogan | 33—138 |
| 1,690,919 | 11/1928 | Baine | 33—138 |
| 2,108,251 | 2/1938 | Clark | 33—138 |
| 2,132,202 | 10/1938 | Carlson | 33—138 |
| 2,162,602 | 6/1939 | Black | 33—89 |
| 2,349,567 | 5/1944 | Townsend et al. | 33—189 |
| 2,448,440 | 8/1948 | King | 33—95 |
| 2,450,769 | 10/1948 | Rothblum | 33—107 |
| 2,466,357 | 4/1949 | Beth | 33—42 |
| 2,684,534 | 7/1954 | Ljungberg | 33—138 |
| 2,695,454 | 11/1954 | Dart | 33—138 |
| 2,840,914 | 7/1958 | Buckelew | 33—138 |
| 2,841,879 | 7/1958 | Lanshi | 33—189 |
| 2,855,693 | 10/1958 | Holsten | 33—189 |

WILLIAM D. MARTIN, JR., *Primary Examiner.*

LEONARD FORMAN, R. B. HULL, I. LISANN,
*Examiners.*

UNITED STATES PATENT OFFICE
CERTIFICATE OF CORRECTION

Patent No. 3,364,581                           January 23, 1968

Peter Andrews

It is hereby certified that error appears in the above numbered patent requiring correction and that the said Letters Patent should read as corrected below.

In Figure 3 of the drawing, the reference numeral 11′ should be applied to indicate the bore and reference numeral 18 should be applied to the stud, located in the bore 11′, that has the transverse nib 12 on its upper end as seen in Figure 4 and, in Figure 3 of the drawing, the reference numeral 111 should be applied to the top of boss 11 which is seen in front view in Figure 5 of the drawing. In Figure 5 of the drawing, reference numeral 14 should be applied to the rule having the transverse nib 12 located in a groove to which reference numeral 16 should be applied and reference numeral 111 should be applied to the top of boss 11 that is adjacent to the top edge of rule 14 and reference numeral 31 should be applied to the scalloped area in the bottom front view of head 1. In Figure 11 of the drawing, a small circle should be inserted in the lower right corner of cover 20 and the reference numeral 222 should be applied to the circle to indicate a hole for cam pivot shaft 22. Column 4, line 49, reference numeral "11" should read -- 11′ --; same line 49, after "nib" insert -- or transverse rib --. Column 5, line 10, "1" should read -- 4 --; line 18, "which" should read -- that ---; line 19, "end or straight end 37" should read -- the straight end of tape 24 (not shown) --; line 30, "Rib 24" should read -- Rib 36 --; line 47, "can" should read -- cam --. Column 7, lines 7 and 8, "64", each occurrence, should read -- 84 --; line 15, beginning with "The screw 64" cancel all to and including "if so desired." in line 34, same column 7; line 42, "4" should read -- 24 --. Column 8, line 8, cancel "it"; line 10, "37" should read -- 38 --; same line 10, after "anchored" insert -- (not shown) --; same line 10, cancel "38". Column 9, lines 51 and 52, "graduated," should read -- graduated --; line 54, "springs" should read -- springs' --. Column 10, lines 23 and 41, "graduated,", each occurrence, shou read -- graduated --. Column 11, line 15, "the", first occurrence, should read -- an --. Column 12, line 16, beginning with "15. A head" cancel all to and including "level vial." in line 44, and insert 15. A head for a square having a rule member comprising in combination: a head having one of its ends slotted for receiving said member therein, said head being formed with a bore in the plane of said slot with one end of said bore exiting into an opening remote from said slot, said bore and said opening having substantially therein a means for releasably clamping said member to at least one bottom portion of said slot, said means being a stud having a means thereon one of its ends being received substantially in said opening for releasably clamping a transverse rib on the other end of said stud against said member, said other end being formed to present a finger and having said rib thereon that may be presented to said member to engage either face thereof to either side of said head, said head being elongated and having two side edges disposed to substantially extend from said bottom portion of said slot and at least one of said edges extends at a right angle to said bottom portion of said slot, said head having an aperture in its lower disposed portion with said aperture being remote from said slot and leading into an enclosed cavity within said head wherein a resilient graduated flexible measuring tape of concavo-convex cross sectional shape and a spirally coiled spring means anchored at its inner end to said head is housed, said spring means having its outer end operatively secured to an inner end of said tape and tending to hold said tape in its wound position, said tape having a hook secured to its extended end and when said tape is drawn out of said aperture it substantially forms an extension of at least one edge portion of said head, said head having a tape lock means located in said cavity for releasably locking said tape in an extended position, and located in said head having its length parallel to at least one edge portion of said head is a level vial.

Signed and sealed this 28th day of October 1969.

(SEAL)
Attest:

EDWARD M. FLETCHER, JR.
Attesting Officer

WILLIAM E. SCHUYLER, JR
Commissioner of Patents